(12) United States Patent
Burriel (10) Patent No.: US 12,281,965 B2
(45) Date of Patent: Apr. 22, 2025

(54) MONITORING OF AN ASPIRATING DETECTION SYSTEM

(71) Applicant: Carrier Corporation, Palm Beach Gardens, FL (US)

(72) Inventor: Ricard Burriel, Barcelona (ES)

(73) Assignee: CARRIER CORPORATION, Palm Beach Gardens, FL (US)

( * ) Notice: Subject to any disclaimer, the term of this patent is extended or adjusted under 35 U.S.C. 154(b) by 269 days.

(21) Appl. No.: 18/158,553

(22) Filed: Jan. 24, 2023

(65) Prior Publication Data

US 2023/0236082 A1    Jul. 27, 2023

(30) Foreign Application Priority Data

Jan. 24, 2022   (EP) ..................................... 22382044

(51) Int. Cl.
  *G01M 3/28*    (2006.01)
  *A62C 37/50*   (2006.01)
  *G01N 1/26*    (2006.01)

(52) U.S. Cl.
  CPC ........... *G01M 3/2815* (2013.01); *A62C 37/50* (2013.01)

(58) Field of Classification Search
  CPC ............ G01M 3/00; G01M 3/26; G01M 3/28; G01M 3/2815; A62C 37/00; A62C 37/50; G01N 1/00; G01N 1/02; G01N 1/22; G01N 1/26
  See application file for complete search history.

(56) References Cited

U.S. PATENT DOCUMENTS

| 3,866,475 A |   | 2/1975  | Thompson et al. |
|---|---|---|---|
| 4,363,236 A | * | 12/1982 | Meyers .................... G01M 3/26 73/40 |
| 5,063,787 A |   | 11/1991 | Khuzai et al. |

(Continued)

FOREIGN PATENT DOCUMENTS

| CN | 106197576 A | 12/2016 |
|---|---|---|
| CN | 106441468 A | 2/2017 |

(Continued)

OTHER PUBLICATIONS

Machine Translation of FR-2276577-A1 (Year: 1976).*
European Search Report for Application No. 22382044.0; Issued Jul. 25, 2022; 6 Pages.

*Primary Examiner* — Nguyen Q. Ha
(74) *Attorney, Agent, or Firm* — CANTOR COLBURN LLP (57) ABSTRACT

A detector unit for use in an aspirating detection system. The detector unit includes an aspirator for drawing air along at least one sampling pipe and into the detector unit; a sensor chamber for analysing a sample of the air drawn into the detector unit; a Venturi conduit through which the air is moved by the aspirator, the Venturi conduit including a first portion of the Venturi conduit and a second portion of the Venturi conduit, a cross-sectional area of the first portion being smaller than a cross-sectional area of the second portion; a pressure sensor configured to detect a differential pressure between the air in the first portion and the air in the second portion of the Venturi conduit; and a controller configured to determine a leak and/or a blockage in the aspirating detection system based on the detected differential pressure.

15 Claims, 2 Drawing Sheets

(56) References Cited

U.S. PATENT DOCUMENTS

| | | |
|---|---|---|
| 6,698,297 B2 | 3/2004 | Gysling |
| 6,868,741 B2 | 3/2005 | Harman |
| 6,935,189 B2 | 8/2005 | Richards |
| 7,015,820 B2 | 3/2006 | Bobenhausen |
| 7,299,707 B1 | 11/2007 | Evans |
| 7,406,880 B2 | 8/2008 | Orleskie et al. |
| 7,730,793 B2 | 6/2010 | Speldrich |
| 8,294,587 B2 | 10/2012 | Panz et al. |
| 10,072,958 B2 | 9/2018 | Betz |
| 10,126,156 B2 | 11/2018 | Chen et al. |
| 10,207,134 B2 | 2/2019 | Alexander et al. |
| 10,466,082 B2 | 11/2019 | Birch et al. |
| 10,563,886 B2 | 2/2020 | McCormick et al. |
| 10,576,318 B1 | 3/2020 | Ringer et al. |
| 10,598,527 B2 | 3/2020 | Dillard et al. |
| 2016/0223437 A1 | 8/2016 | Ajay et al. |
| 2020/0316420 A1 | 10/2020 | Morrison et al. |
| 2021/0348982 A1 | 11/2021 | Moix Olive |

FOREIGN PATENT DOCUMENTS

| | | | |
|---|---|---|---|
| CN | 107063364 A | 8/2017 | |
| CN | 107452190 A | 12/2017 | |
| CN | 209027597 U | 6/2019 | |
| CN | 108548574 B | 12/2019 | |
| CN | 108593019 B | 12/2019 | |
| CN | 210346776 U | 4/2020 | |
| CN | 108562339 B | 8/2020 | |
| CN | 108593020 B | 1/2021 | |
| EP | 0975948 B1 | 8/2002 | |
| EP | 2470876 B1 | 4/2017 | |
| EP | 2542874 B1 | 5/2019 | |
| EP | 2318814 B1 | 9/2019 | |
| EP | 3907484 A1 | 11/2021 | |
| FR | 2276577 A1 * | 1/1976 | ............... G01N 1/26 |
| WO | 2020208697 A1 | 10/2020 | |

* cited by examiner

MONITORING OF AN ASPIRATING DETECTION SYSTEM

FOREIGN PRIORITY

This application claims priority to European Patent Application No. 22382044.0, filed Jan. 24, 2022, and all the benefits accruing therefrom under 35 U.S.C. § 119, the contents of which in its entirety are herein incorporated by reference.

TECHNICAL FIELD OF INVENTION

The present invention relates to a detector unit for use in an aspirating detection system and a method of determining a leak and/or a blockage in an aspirating detection system using a detector unit.

BACKGROUND OF THE INVENTION

Aspirating detection systems are commonly used to detect the presence of smoke or noxious gases, such as CO or NOx, in a building. These systems achieve this by using an aspirator to draw large quantities of air into one or more sampling pipes located around the building. The air travelling through the one or more sampling pipes is fed into a detector unit, where the aspirator is housed. The detector unit comprises a sensor chamber, which may be used to sense the presence of smoke and/or noxious gases in the air sample. If the amount detected exceeds a predetermined limit, an alarm may be raised and/or a fire suppression system may be activated.

There are two critical aspects of an aspirating detection system: the detection of an alarm condition, and the monitoring of the system itself. The latter aspect is important to ensure that the system is operating as expected. If this is not the case, then the ability of the system to detect an alarm condition is compromised. As aspirating detection systems rely on a constant flow of air through the sensor chamber in order to detect an alarm condition, it is therefore important to monitor for any situations which will impact the flow rate of the air passing through the detector unit.

The flow of air through the detector unit can be impacted by a number of factors. For example, a sampling pipe or a conduit within the detector unit may get broken. This may lead to unwanted leaks, causing a sudden increase in flow rate, or an accumulation of external debris within the pipes, causing a sudden decrease in flow rate. Any sudden changes in flow rate may therefore be indicative of damage to the system.

Current aspirating detection systems often rely on measurements of the flow rate through the detector unit to identify leaks and/or blockages in the aspirating detection system. These systems typically employ temperature sensors, such as thermistors, in order to measure the flow rate through the detector unit. These temperature sensors are reliable, but are relatively complex as they require complex processing circuitry. In addition, the temperature sensors must be calibrated both during manufacture and during installation of the detection system in order to gain accurate results for the flow rate. Routine calibration may then be subsequently required in order to ensure correct operation of the temperature sensors. The use of temperature sensors for flow rate determination is therefore costly, time-intensive, and introduces complexity to the detection system.

As such, there is a need for an improved detector unit for an aspirating detection system that is capable of determining leaks and/or blockages in the aspirating detection system.

SUMMARY OF THE INVENTION

According to a first aspect of the invention, a detector unit for use in an aspirating detection system is provided. The detector unit comprises an aspirator for drawing air from an interior of a building along at least one sampling pipe and into the detector unit; a sensor chamber for analysing a sample of the air drawn into the detector unit; a Venturi conduit through which the air is moved by the aspirator, the Venturi conduit comprising a first portion of the Venturi conduit and a second portion of the Venturi conduit, a cross-sectional area of the first portion being smaller than a cross-sectional area of the second portion; a pressure sensor configured to detect a differential pressure between the air in the first portion and the air in the second portion of the Venturi conduit; and a controller configured to determine a leak and/or a blockage in the aspirating detection system based on the detected differential pressure.

In aspirating detection systems, it should be ensured that the fluid flow passing through the detector unit of the system is not impeded in any way. If the flow is impeded, then the detection capability of the system may be negatively impacted as a consequence. It is therefore advantageous to regularly monitor for any leaks and/or blockages in the aspirating detection systems. In prior art systems, leaks and/or blockages are often detected through the determination of the rate of flow through the detector unit. In these systems, the rate of flow is typically measured using feedback from temperature sensors within the detector unit. However, this technique requires calibration of the sensors both during manufacture and during installation of the aspirating detection system. Further, the determination of the flow rate based on the sensor data from the temperature sensors can be relatively complex. In contrast, the detector unit of the present invention utilises pressure data to determine a leak and/or a blockage in the aspirating detection system. In particular, a differential pressure is measured across two sections of a Venturi conduit with different cross-sectional areas. Leaks and/or blockages in the aspirating detection system can then be determined based on the differential pressure. The detected differential pressure is related to the flow rate through Bernouilli's principle, as a result of the Venturi effect. Consequently, sudden changes in the flow rate through the Venturi conduit, which can be indicative of leaks and/or blockages in the aspirating detection system, also cause sudden changes in the detected differential pressure in the Venturi conduit. It is therefore possible to monitor for leaks and/or blockages in the aspirating detection system through the monitoring of the differential pressure alone. This technique of determining leaks and/or blockages is much simpler and more cost-effective than the techniques used by prior art systems, as the data processing and calibration requirements are greatly reduced.

The aspirator may comprise a fan unit configured to draw air into the detector unit. The aspirator may be a centrifugal blower. The aspirator may be configured to draw at least 100 litres of air into the detector unit per minute, optionally at least 500 litres per minute, and further optionally at least 1000 litres per minute. The aspirator may be a fixed-speed aspirator. That is, the aspirator may be configured to operate at a single, substantially constant speed. The speed at which the aspirator operates may be determined by the specific configuration of the detector unit and/or the aspirating detection system in which it is used. In other embodiments, the aspirator may be a variable-speed aspirator, and the detector may be configured to operate the aspirator at a single, substantially constant speed.

The detector unit may be a fire detector unit, a gas detector unit, and/or an air quality detector unit. The aspirating detection system may be an aspirating fire detection system, an aspirating gas detection system, and/or an aspirating air quality detection system.

The detector unit may be a particle detector unit. For example, the detector unit may be a smoke detector unit. The aspirating detection system may be an aspirating smoke detection system. The sensor chamber may be for detecting the presence of smoke particles in the sample of the air. The controller may be configured to receive sensor data from the sensor chamber. The controller may be configured to process the sensor data from the sensor chamber in order to determine if the amount of smoke particles is above a predetermined level. The detector unit may be configured to enter an alarm state if the detected amount of smoke particles is above the predetermined level. In particular, the controller may be configured to trigger an alarm state in the detector unit if the detected amount of smoke particles is above the predetermined level. Additionally or alternatively, the detector unit may be a pollutant detector unit. The pollutant detector unit may be configured to detect pollutants such as carbon monoxide, nitrogen oxides, and/or sulphur oxides. The sensor chamber may be for detecting the presence of pollutants in the sample of air. The controller may be configured to trigger an alarm state in the detector unit if the detected amount of pollutants is above a predetermined level.

The sensor chamber may comprise an optical smoke sensor. The optical smoke sensor may operate according to a light-scattering principle. The optical smoke sensor may comprise a light source, a light absorber, and/or a light detector. The light source may be a laser. The light detector may be a photodetector.

The Venturi conduit may be a tube and the cross-sectional area of the Venturi conduit may be circular. However, the cross-section of the Venturi conduit may not be limited to a circular shape, and may be any given shape, such as rectangular, square, ovoid, and/or irregular. The shape of the cross-section of the Venturi conduit may vary along its length. The Venturi conduit comprises a first portion of the Venturi conduit and a second portion of the Venturi conduit. The cross-sectional area of the first portion is smaller than the cross-sectional area of the second portion. The cross-section of the first portion may have the same shape or a different shape to the cross-section of the second portion.

The Venturi conduit may comprise additional portions, such as third, fourth, and fifth portions. For example, the Venturi conduit may comprise a third portion, wherein the second portion of the Venturi conduit may be located at a first, upstream end of the first portion and the third portion of the conduit may be located at a second, downstream end of the first portion. The third portion of the Venturi conduit may have a cross-sectional area that is greater than the cross-sectional area of the first portion. The third portion of the Venturi conduit may have a cross-sectional area that is equal to the cross-sectional area of the second portion.

The Venturi conduit may be configured such that the pressure of the air entering the conduit is substantially equal to the pressure of the air exiting the Venturi conduit. As such, the Venturi conduit may be configured such that a pressure difference between the second and third portions of the Venturi conduit is substantially zero.

The Venturi conduit may be configured such that air flowing through the Venturi conduit remains substantially laminar and does not form turbulent zones within the Venturi conduit.

As a result of the Venturi effect, the pressure of a fluid passing through a constriction will decrease as compared to the pressure of a fluid prior to or following the constriction. The pressure of the air passing through the first portion of the Venturi conduit is therefore less than the pressure of the air passing through the second portion of the Venturi conduit. The detector unit may be configured such that the first portion of the Venturi conduit is downstream or upstream of the second portion of the Venturi conduit. The terms "upstream" and "downstream" are to be understood with reference to a normal direction of airflow through the detector unit, i.e. when monitoring air samples. The detector unit may therefore be configured such that the pressure of the air decreases as it passes through the first and second sections of the Venturi conduit, or it may be configured such that the pressure of the air increases as it passes through the first and second sections of the Venturi conduit.

The pressure sensor is configured to detect a differential pressure between the air in the first portion of the Venturi conduit and the air in the second portion of the Venturi conduit. The differential pressure may be the difference in pressure between the air in the first portion of the Venturi conduit and the air in the second portion of the Venturi conduit. The pressure sensor may be in communication with the air in both the first portion and the second portion of the Venturi conduit. The pressure sensor may be, for example, a manometer. The pressure sensor may be configured to detect the differential pressure continuously. Alternatively, the pressure sensor may be configured to detect the differential pressure periodically, for example at an interval of a least once every minute, optionally at least once every 10 seconds, and further optionally at least once every second. The pressure sensor may be configured to communicate the detected differential pressure to the controller, for example on a periodic basis, such as once every five seconds, once every 10 seconds, or once every 30 seconds.

The controller is configured to determine a leak and/or a blockage in the aspirating detection system based on the detected differential pressure. The detected differential pressure may be indicative of a flow rate through the Venturi conduit. The relationship between the detected differential pressure and the flow rate through the Venturi conduit may be defined according to the Venturi effect and Bernouilli's principle. Leaks and/or blockages in the aspirating detection system may cause changes to the flow rate through the Venturi conduit. As such, changes to the detected differential pressure may be indicative of a leak and/or a blockage in the aspirating detection system. The controller may comprise a processor and a memory for storing instructions that are carried out by the processor. The memory may be configured to store instructions for determining a leak and/or a blockage in the aspirating detection system based on the detected pressure differential. The processor may be configured to determine a leak and/or a blockage in the aspirating detection system based on the detected differential pressure. The controller may comprise a central processing unit (CPU). The controller may be configured to store the detected differential pressure, for example using its memory.

Additionally, the controller may be configured to calculate the flow rate of air through the Venturi conduit based on the differential pressure. The calculation may be performed periodically, for example every 5 seconds, 10 seconds, or 30 seconds. The processor may be configured to determine the flow rate through the Venturi conduit based on instructions stored in the memory of the controller. The controller may be configured to store the determined flow rate through the conduit, for example using its memory.

The controller may be configured to determine a variation in the flow rate or the detected differential pressure over a given period of time. For example, the controller may be configured to determine a variation in the detected differential pressure over a period of at least 5 seconds, at least 10 seconds, or at least 30 seconds. The variation may be a percentage variation. The controller may be configured to determine the percentage variation in the detected differential pressure relative to an upper bound, a mid-point, or a lower bound of the differential pressure detected during the given period of time. The variation may be a variation range, e.g. the difference between a maximum differential pressure and a minimum differential pressure during the period. Additionally or alternatively, the controller may be configured to determine a variation that is a deviation from an expected value, such as a predetermined differential pressure or an average differential pressure over a longer period. The controller may be configured to store the determined variation in the detected differential pressure, for example using its memory.

Air may be fed into the detector unit through the one or more sampling pipes. If these sampling pipes are damaged, the flow of air passing through the aspirating detection system may be disrupted. For example, damage to the one or more sampling pipes may create an unwanted opening in the sampling pipes. This opening may cause a portion of the air in the sampling pipes to leak, which may result in a faster air flow rate through the detector unit due to the change in pressure caused by the leak. Alternatively, the opening may expose the air within the one or more sampling pipes to debris, which may enter the one or more sampling pipes through the opening. If this debris accumulates within the sampling pipes, it may obstruct the flow of air through the sampling pipes and create a blockage, thus causing a decrease in the air flow rate in the detector unit. Such changes in the air flow rate may also occur due to any damage caused to the conduit(s) of the detector unit. As such, any significant changes to the air flow through the detector unit may be indicative of damage to the aspirating detection system. As explained previously, the detected differential pressure in the Venturi conduit may be indicative of the flow rate through the Venturi conduit. Hence, any significant changes to the detected differential pressure may also be indicative of damage to the aspirating detection system.

Small variations in the air flow rate in the detector unit may be expected. For example, the air flow rate in the detector unit may be dependent on the ambient temperature or pressure of the room in which the detector unit is placed. Consequently, small variations in the detected differential pressure may also be expected. As a result, slight variations in the detected differential pressure in the detector unit may not be indicative that the aspirating detection system is damaged.

The controller may be configured to compare the determined variation in the detected differential pressure to a predetermined threshold value. The predetermined threshold value may be a value of the variation in the detected differential pressure that is indicative of damage, such as leaks and/or blockages, to the aspirating detection system. As damage can be indicated by the detected differential pressure increasing or decreasing, the controller may be configured to compare the magnitude of the variation in the detected differential pressure to the predetermined threshold value.

The predetermined threshold value may be between 20% to 40%, preferably about 30%. The predetermined threshold value may correlate to an upper limit of a percentage variation in the differential pressure that is measured relative to an upper bound, a mid-point, or a lower bound of the differential pressure detected during a given period of time. Additionally or alternatively, the predetermined threshold value may correlate to an upper limit of a percentage variation in the differential pressure that is measured relative to an expected differential pressure or to an average differential pressure, such as a mean or calibrated differential pressure. The predetermined threshold value may vary depending on the particular implementation of the system, and/or may be set according to the environment in which the detector unit and/or aspirating detection system is located. The predetermined threshold value may be independent of any expected value in the differential pressure. That is, the predetermined threshold value may not be determined with reference to any expected value in the differential pressure. Therefore, the predetermined threshold value may be indicative of a comparison between two consecutive differential pressure measurements, rather than a comparison between a differential pressure measurement and an expected differential pressure. In this way, the detection of leaks and/or blockages in the aspirating detection system may not be reliant on the accuracy of the pressure sensor.

The predetermined threshold value may correspond to an upper limit of a percentage variation in the flow rate over a given period of time, for example the predetermined threshold value may correspond to a percentage variation in the flow rate of 10% to 20%, preferably about 15%. Additionally or alternatively, the controller may be configured to determine a variation in the flow rate over a given period of time. The controller may be configured to compare the variation in the flow rate to a predetermined threshold value in the flow rate. The predetermined threshold value in the flow rate may be a percentage variation in the flow rate between 10% to 20%, preferably about 15%.

The controller may be configured to generate an alert if the detected variation in the differential pressure exceeds the predetermined threshold value, for example an audible and/or visual alert. The detector unit may comprise an LED light, and the controller may be configured to indicate the alert through the LED light. Additionally or alternatively, the detector unit may comprise a speaker and the controller may be configured to indicate the alert as a sound through the speaker. The detector unit may comprise a display, and may be configured to communicate the alert to users via the display. The detector unit may comprise a wireless transceiver. The wireless transceiver may be in communication with the controller. The controller may communicate the alert to a remote unit using the wireless transceiver. The controller may communicate the alert as, for example, a radio frequency signal, a Wi-Fi signal, and/or an infrared signal. In this way, a user may be informed rapidly regarding any potential faults within the aspirating detection system.

The detector unit may comprise a primary conduit and/or a sampling conduit. The sampling conduit may be configured to provide air to the sensor chamber and a bypass portion of the primary conduit may bypass the sensor chamber. The primary conduit may connect the aspirator to an outlet of the detector unit. The bypass portion of the primary conduit may be configured to receive the majority of the air entering the detector unit. For example, the bypass portion of the primary conduit may be configured to receive at least 90%, such as between 95% to 99%, of the air entering the detector unit. The sampling conduit may be configured to provide air to the sensor chamber. The sampling conduit may be configured to receive a small proportion of the air entering the detector unit, for example the sampling conduit may be configured to receive less than 10%, such as between 1% to 5%, of the air entering the detector unit. The sampling conduit may branch off from the primary conduit at a location downstream of the aspirator and may re-join the primary conduit at a location upstream of the outlet of the detector unit. The bypass portion of the primary conduit may be a portion of the primary conduit between the branch-off and the re-joiner of the sampling conduit. Preferably, the primary conduit, either upstream or downstream of the branch-off or re-joiner, comprises the Venturi conduit comprising the first and second portions. However, the sampling conduit may comprise the Venturi conduit comprising the first and second portions.

The detector unit may comprise an outlet through which air exits the detector unit. The Venturi conduit may be positioned adjacent to the outlet of the detector unit. For example, the Venturi conduit may be directly upstream of the outlet of the detector unit.

The detector unit may comprise one or more inlets through which air enters the detector unit, for example from the one or more sampling pipes. The Venturi conduit may be positioned adjacent to one of the inlets of the detector unit. For example, the Venturi conduit may be directly upstream or downstream of the inlet of the detector unit.

The Venturi conduit may be positioned at a midpoint between the inlet and the outlet of the detector unit, for example as described above.

The detector unit may comprise one or more filters for removing debris from the air entering the sensor chamber. The one or more filters may be positioned upstream of the sensor chamber. The debris may comprise large particles, such as dust and the like, which may interfere with the proper functioning of the sensor chamber if present in the sensor chamber. The one or more filters may prevent the debris entering the sensor chamber, thus ensuring the sensor chamber can function properly.

In an exemplary embodiment, an aspirating detection system may be provided. The aspirating detection system may comprise a detector unit and one or more sampling pipes. The aspirating detection system may be configured such that air is drawn into the detector unit via the sampling pipes. The detector unit may be the detector unit of the first aspect, and may comprise any of the features described herein with reference to the detector unit of the first aspect. In this case, the aspirator of the detector unit may draw air into the detector unit via the sampling pipes.

The aspirating detection system may be for installation in a building. The aspirating detection system may extend across one or more rooms of the building. For example, the sampling pipes may be for installation in a plurality of rooms within a building. The sampling pipes may be spaced apart from one another, for example at a distance of at least 1 m, at least 2 m, or at least 5 m from one another. Each sampling pipe may comprise a plurality of sampling holes. The sampling pipes may be configured such that air is drawn into the sampling pipes through the sampling holes.

According to a second aspect of the invention, a method for determining a leak and/or a blockage in an aspirating detection system using a detector unit is provided. The method comprises: drawing air from an interior of a building through a Venturi conduit of a detector unit using an aspirator of the detector unit, the Venturi conduit comprising a first portion of the Venturi conduit and a second portion of the Venturi conduit, wherein a cross-sectional area of the first portion is smaller than a cross-sectional area of the second portion; detecting a differential pressure between the air in the first portion of the Venturi conduit and the air in the second portion of the Venturi conduit; and determining a leak and/or a blockage in the aspirating detection system based on the detected differential pressure.

The method may comprise using a fan unit and/or a centrifugal blower to draw air into the Venturi conduit. The method may comprise drawing at least 100 litres of air into the detector unit per minute, optionally at least 500 litres per minute, and further optionally at least 1000 litres per minute.

The method may be for determining a leak and/or blockage in an aspirating smoke detection system using a smoke detector unit. The method may include detecting the amount of smoke particles in the flow of air. The method may include determining if the amount of smoke particles is above a predetermined level. The method may include triggering an alarm state in the detector unit if the detected amount of smoke particles is above the predetermined level.

The method may include using an optical smoke sensor to determine the amount of smoke particles in the air flow. The method may include using a light-scattering principle to determine the amount of smoke particles in the air flow.

The method may include drawing air through a tube-shaped Venturi conduit with a circular cross-sectional area. However, the cross-section of the Venturi conduit may not be limited to a circular shape, and may be any given shape, such as rectangular, square, ovoid, and/or irregular. The shape of the cross-section of the conduit may vary along its length. The Venturi conduit comprises a first portion of the Venturi conduit and a second portion of the Venturi conduit. The cross-section of the first portion may have the same shape or a different shape to the cross-section of the second portion.

The method may include drawing air through the first portion of the Venturi conduit before drawing air through the second portion of the Venturi conduit, or vice versa.

The method may include using a pressure sensor, such as a manometer, to detect a differential pressure between the air in the first portion of the Venturi conduit and the air in the second portion of the Venturi conduit. The method may include placing the pressure sensor in communication with the air in both the first portion and the second portion of the Venturi conduit. The method may include detecting the differential pressure continuously. Alternatively, the method may include detecting the differential pressure periodically, for example at an interval of a least once every minute, optionally at least once every 10 seconds, and further optionally at least once every second. The method may include communicating the detected differential pressure to a controller of the detector unit.

The method may include using a controller of the detector unit to determine a leak and/or a blockage in the aspirating detection system. The method may include storing instructions for determining a leak and/or a blockage in the aspirating detection system in a memory of the controller. The method may include using a processor of the controller to determine a leak and/or a blockage in the aspirating detection system based on the detected differential pressure. The method may include periodically storing the detected differential pressure in the controller, for example in the memory of the controller. The method may include using the controller to determine a flow rate of air through the Venturi conduit based on the detected differential pressure. The method may include storing the determined flow rate in a memory of the controller.

The method may include determining a variation in the detected differential pressure over a given period of time. For example, the method may include determining a variation in the detected differential pressure over a period of at least 5 seconds, at least 10 seconds, or at least 30 seconds. The method may include determining a percentage variation in the detected differential pressure relative to an upper bound, a mid-point, or a lower bound of the differential pressure detected during the given period of time. The method may include storing the determined variation in the detected differential pressure, for example in the memory of the controller.

The method may include feeding the air into the detector unit through one or more sampling pipes.

The method may include comparing the determined variation in the detected differential pressure to a predetermined threshold value. The predetermined threshold value may be a value of the variation in detected differential pressure that is considered to be indicative of damage to the aspirating detection system, particularly of a leak and/or blockage in the aspirating detection system. As damage can be indicated by the air flow rate increasing or decreasing, and therefore the differential pressure increasing or decreasing, the method may include comparing the magnitude of the variation in the detected differential pressure to the predetermined threshold value.

The method may include using a predetermined threshold value of between 20% to 40%, preferably about 30%. The method may include using a predetermined threshold that correlates to an upper limit of a percentage variation in the differential pressure that is measured relative to an upper bound, a mid-point, or a lower bound of the differential pressure detected during a given period of time. Additionally or alternatively, the method may include using a predetermined threshold value that correlates to an upper limit of a percentage variation in the differential pressure that is measured relative to an average differential pressure, such as a mean or calibrated differential pressure. The method may include setting the predetermined threshold value according to the environment in which the detector unit and/or aspirating detection system is located.

The method may include using a predetermined threshold value that corresponds to an upper limit of a percentage variation in the flow rate over a given period of time, for example the method may include using a predetermined threshold value that corresponds to a percentage variation in the flow rate of 10% to 20%, preferably about 15%. Additionally or alternatively, the method may include determining a variation in the flow rate over a given period of time. The method may include comparing the variation in the flow rate to a predetermined threshold value in the flow rate. The method may include using a predetermined threshold value in the flow rate that is a percentage variation in the flow rate between 10% to 20%, preferably about 15%.

The method may include generating an alert if the detected variation in the determined differential pressure exceeds the predetermined threshold value, for example an audible and/or visual alert. The method may include indicating the alert through an LED light of the detector unit. Additionally or alternatively, the method may include indicating the alert as a sound through a speaker of the detector unit. The method may include communicating the alert to users via a display of the detector unit. The method may include using a wireless transceiver of the detector unit to communicate the alert to a remote unit. The method may include communicating the alert as, for example, a radio frequency signal, a Wi-Fi signal, and/or an infrared signal.

The method may include drawing air through a primary conduit that connects the aspirator to an outlet of the detector unit and/or a sampling conduit that connects the aspirator to a sensor chamber of the detector unit. The method may include drawing the majority of the air entering the detector unit into a bypass portion of the primary conduit, which bypasses the sensor chamber. For example, the method may include drawing at least 90%, such as between 95% to 99%, of the air entering the detector unit into the bypass portion of the primary conduit. The method may include drawing a minority of the air entering the detector unit into the sampling conduit, for example the method may include drawing less than 10%, such as between 1% to 5%, of the air entering the detector unit into the sampling conduit. Preferably, the primary conduit comprises the Venturi conduit comprising the first and second portions. However, the sampling conduit may comprise the Venturi conduit comprising the first and second portions.

The method may include drawing the air through an outlet of the detector unit. The Venturi conduit may be positioned adjacent to the outlet of the detector unit. For example, the Venturi conduit may be positioned directly upstream of the outlet of the detector unit. The method may include drawing air through one or more inlets of the detector unit, for example from the one or more sampling pipes. The Venturi conduit may be positioned adjacent to one of the inlets of the detector unit. For example, the Venturi conduit may be positioned directly upstream or downstream of the inlet of the detector unit. The Venturi conduit may be positioned at a midpoint between the inlet and the outlet of the detector unit.

The method may include using one or more filters for removing debris from the air entering a sensor chamber of the detector unit. The one or more filters may be positioned upstream of the sensor chamber.

The method of the second aspect may be carried out using a detector unit as recited herein with reference to the first aspect.

According to a further aspect, a method may be provided that comprises providing, configuring, and/or operating a system as recited herein with reference to the first aspect.

BRIEF DESCRIPTION OF THE DRAWINGS

Certain embodiments of the disclosure will now be described by way of example only and with reference to the accompanying drawings, in which.

DETAILED DESCRIPTION OF THE INVENTION

Figure 1:
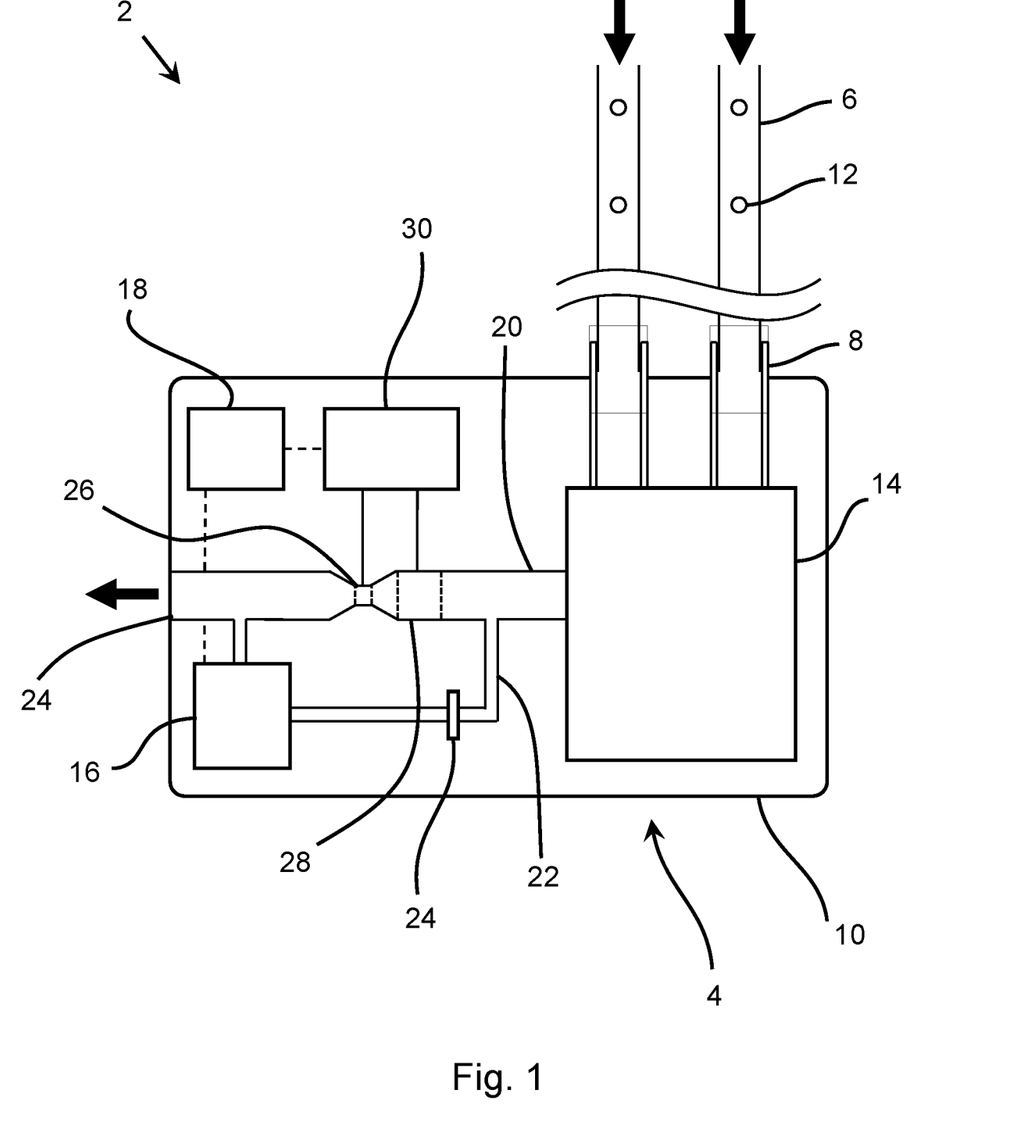
FIG. 1 shows a schematic diagram of an aspirating smoke detection system.

An aspirating detection system 2 is shown in FIG. 1. The system 2 may comprise a detector unit 4 and a plurality of sampling pipes 6 for feeding air into the detector unit 4. The sampling pipes 6 may each be connected to a respective inlet 8 of the detector unit 4, with each inlet 8 extending through a housing 10 of the detector unit 4. Whilst the aspirating detection system 2 of FIG. 1 is shown with only two sampling pipes 6, it will be appreciated that the system 2 may comprise any number of sampling pipes 6. The aspirating detection system 2 may be located within a single room or multiple rooms of a building, and may be for detecting the presence of smoke in the room(s).

The sampling pipes 6 may each comprise a plurality sampling holes 12, through which air may enter the sampling pipes 6. Air is drawn into the sampling pipes 6 by an aspirator 14. As shown in FIG. 1, the aspirator 14 may form part of the detector unit 4. The aspirator 14 may be a fan unit and/or a centrifugal blower. The aspirator 14 may be configured to draw a large amount of air per minute into the detector unit 4 in order to ensure rapid detection of an alarm condition. For example, the aspirator 14 may be configured to draw up to 1000 litres of air per minute into the detector unit 4.

The detector unit 4 comprises a sensor chamber 16 for receiving a portion of the air drawn into the detector unit 4. The sensor chamber 16 may comprise a sensor for detecting an alarm condition. For example, the sensor chamber 16 may comprise a smoke sensor (not shown in FIG. 1), which may be configured to detect the presence of smoke in the air passing through the sensor chamber 16. The smoke sensor may be a high-sensitivity sensor configured to detect small amounts of smoke. For example, the smoke sensor may be an optical smoke sensor, and may comprise a light emitter, a light absorber, and a photodetector. The smoke sensor may detect the presence of smoke based on a light-scattering principle, wherein the detection of light by the photodetector is indicative of the presence of smoke. Alternatively, the sensor chamber may comprise an SOx sensor, a CO sensor, and/or an NOx sensor.

The sensor chamber 16 may be connected to a controller 18 of the detector unit 4. The controller 18 may receive sensor data from the sensor chamber 16 and may be configured to process the sensor data to determine if an alarm should be raised. The controller 18 may be configured to trigger an alarm state in the detector unit 4 if the sensor data indicates that the amount of smoke particles in the air is above a predetermined level. In the alarm state, the controller 18 may trigger an audible and/or visual alarm. The controller 18 may comprise a processor and/or a memory. The processor may be configured to process and analyse the sensor data, and the memory may be configured to store the sensor data.

As shown in FIG. 1, the detector unit 4 may comprise a primary conduit 20 and a sampling conduit 22. The primary conduit 20 may connect the aspirator 14 to an outlet 24 of the detector unit 4. The sampling conduit 22 may branch off from the primary conduit 20 at a point downstream of the aspirator 14, and may connect the primary conduit 20 to the sensor chamber 16. As such, a portion of the air passing through the detector unit 4 may pass through the sampling conduit 22 and into the sensor chamber 16, whilst the remaining portion of the air may pass through a bypass portion of the primary conduit 20 to the outlet 24. The portion of air passing through the sensor chamber 16 may be much smaller than the portion of air passing through primary conduit 20. This is because the sensor in the sensor chamber may only be able to process a certain amount of air, which may be significantly smaller than the amount of air drawn into the detector unit. For example, the primary conduit 20 may receive 95-99% of the air entering the detector unit 4, whilst the sampling conduit 22 may receive only 1-5% of the air entering the detector unit 4.

The detector unit 4 may comprise a filter 24 located within the sampling conduit 22. The filter 24 may be for removing any dust and debris from the airflow before it enters sensor chamber 16.

In the illustrated embodiment, the bypass portion of the primary conduit 20 comprises a first portion 26 and a second portion 28, which form a Venturi conduit within the primary conduit 20. In the detector unit 4 of FIG. 1, the first portion 26 is downstream of the second portion 28. The first and second portions 24, 26 of the primary conduit 20 are shown in further detail in FIG. 2. Whilst the first and second portions 26, 28 are shown as part of the bypass portion of the primary conduit 20 in FIGS. 1 and 2, it will be appreciated that the first and second portions 26, 28 may form part of any conduit within the detector unit 4. For example, the first and second portions 26, 28 may form part of the sampling conduit 22. Further, the first and second portions 26, 28 may be located closer to the outlet 24 of the detector unit 4 than shown in FIG. 1. The first and second portions 26, 28 may be located at any point along each of the conduits 20, 22 of the detector unit 4.

Figure 2:
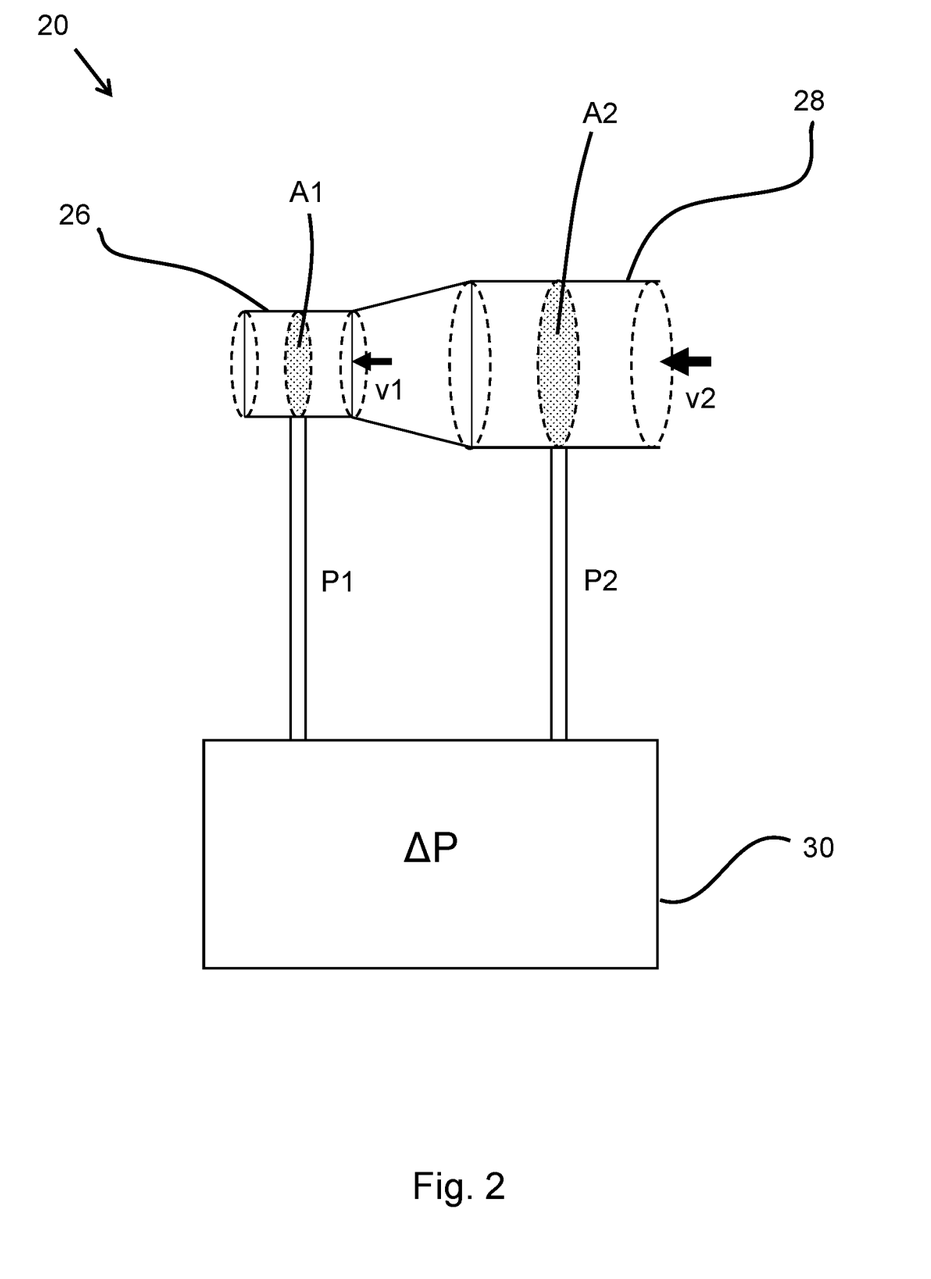
FIG. 2 shows a schematic diagram of a primary conduit of an aspirating smoke detection system.

Referring to FIG. 2, the first portion 26 has a cross-section with a cross-sectional area A1. The second portion 28 has a cross-section with a cross-sectional area A2. The cross-sectional area A1 of the first portion 26 may be smaller than the cross-sectional area A2 of the second portion 28. The first portion 26 and the second portion 28 are shown as tubes, and the cross-sectional areas A1, A2 are shown as being circular. In this example, the radius of the first portion 26 is therefore smaller than the radius of the second portion 28. However, the first and second portions 26, 28 may have any shape of cross-section and are not limited to the cylindrical shape shown.

The speed of the air flow passing through the first portion 26 has a first velocity $v_1$, whilst the speed of the air flow passing through the second portion 28 has a second velocity $v_2$. In accordance with the principle of mass continuity, the speed $v_1$ is expected to be greater than the speed $v_2$ due to the difference in cross-sectional areas A1, A2.

Known as the Venturi effect, a reduction in fluid pressure occurs when a fluid flows through a constricted section of a flow path. That is, the pressure of a fluid in a constricted section of a flow path will be less than the pressure of the fluid in a non-constricted section of the flow path. This drop in pressure can be used to determine the volumetric flow rate through the flow path using Bernoulli's principle.

Following from the above, the pressure P1 of the air in the first portion 26 of the primary conduit 20 will therefore be lower than the pressure P2 of the air in the second portion 28 of the primary conduit 20, and a differential pressure $\Delta P$ will exist between the first and second portions 26, 28. In order to measure this differential pressure $\Delta P$, the detector unit 4 comprises a pressure sensor 30, which is in communication with the air in both the first portion 26 and the second portion 28. The pressure sensor 30 may be a manometer, for example. The pressure sensor 30 is configured to communicate the differential pressure sensor data to the controller 18. The pressure sensor 30 may be configured to communicate the differential pressure sensor data to the controller 18 on a periodic basis, such as once per second, once per 10 seconds, once per 30 seconds, or any other interval. The controller 18 may be configured to determine a leak and/or a blockage in the aspirating detection system based on the differential pressure sensor data. For example, the memory of the controller 18 may store instructions for determining a leak and/or a blockage in the aspirating detection system based on the differential pressure, and the processor of the controller 18 may be configured to execute those instructions. The controller 18 may be further configured to determine a flow rate of the air through the primary conduit 20 based on the detected differential pressure. The memory of the controller 18 may be configured to store the differential pressure data and/or the determined flow rate.

It is critical for an aspirating detection system 2 to maintain a steady and fast-moving flow of air through the system 2. If the flow is interrupted or changed in any way, this can impact the detection capabilities of the detector unit 4. Significant changes in the flow rate of air through the detector unit 4 can be indicative of faults, such as leaks and/or blockages, within the aspirating detection system 2. For example, if a sampling pipe 12 is damaged, unwanted debris may be able to enter the pipe 12. This debris may be in the form of insects, for example. If enough debris enters the sampling pipes 12, a blockage may occur, thus obstructing the air flow through the system 2 and preventing proper operation of the detector unit 4. Alternatively, a break in a sampling pipe 12 or conduit 20, 22 may create an imbalance in pressure in the pipes, and cause the flow to significantly increase. As such, both sudden increases and sudden decreases in the air flow can be indicative of issues within the system 2. However, small variations in the air flow are expected. These may occur, for example, due to changes in the ambient temperature of the room(s) where the aspirating detection system 2 is located.

As mentioned above, the flow rate through the primary conduit 20 is related to the differential pressure between the first portion 26 and the second portion 28 of the primary conduit 20. As such, any changes in the flow rate will cause a corresponding change in the differential pressure. The differential pressure detected by pressure sensor 30 can therefore be used to determine a leak and/or a blockage in the aspirating detection system 2. For example, a sudden change in the differential pressure may be indicative of a leak and/or a blockage in the aspirating detection system 2.

The controller 18 may be configured to determine a percentage variation in the detected differential pressure over a given period of time, for example over a period of 5 seconds, 10 seconds, or 30 seconds. The controller 18 may be configured to store the determined percentage variation in the detected differential pressure, for example in its memory. The controller 18 may be configured to compare the determined percentage variation in the detected differential pressure to a predetermined threshold value. The predetermined threshold value may be a value that is indicative of a fault within the system 2. For example, a percentage variation of about 30% or more (either an increase or a decrease) may be considered to be indicative of a fault, such as a leak and/or a blockage, within the aspirating detection system 2. As such, the predetermined threshold value may be set at about 30%.

Based on the detected differential pressure, in particular based on the determined percentage variation in the detected differential pressure, the controller 18 may be configured to generate an alert. The controller 18 may generate an alert if the determined percentage variation in the detected differential pressure is above the predetermined threshold value. The alert may be one or more of an audible alert, a visual alert, or a wirelessly transmitted notification. For example, the detector unit 4 may comprise an LED light and/or a display, and the alert may be visually shown through the LED light and/or display. Additionally or alternatively, the detector unit 4 may comprise a speaker, and the alert may be announced through the speaker. The detector unit 4 may comprise a wireless transceiver that is in communication with the controller 18. The controller 18 may be configured to communicate the alert to the wireless transceiver, and the wireless transceiver may in turn be configured to communicate the alert to a remote device, such as a smartphone, tablet, and/or control panel.

Hence, an improved detector unit 4 is provided, which utilises an expected change in pressure through one of its conduits 20, 22 in order to determine any leaks and/or blockages in the aspirating detection system 2 that the detector unit 4 is used in. The detector unit 4 of the present invention therefore offers a simple and effective way of determining leaks and/or blockages in the aspirating detection system 2, which is an advantageous alternative to the more costly, complex, and time-consuming current methods of determining leaks and/or blockages in the aspirating detection system 2.

What is claimed is:

1. A detector unit for use in an aspirating detection system within a building, comprising:
    an aspirator for drawing air from an interior of the building along at least one sampling pipe and into the detector unit;
    a sensor chamber for analysing a sample of the air drawn into the detector unit;
    a Venturi conduit through which the air is moved by the aspirator, the Venturi conduit comprising a first portion of the Venturi conduit and a second portion of the Venturi conduit, a cross-sectional area of the first portion being smaller than a cross-sectional area of the second portion;
    a pressure sensor configured to detect a differential pressure between the air in the first portion and the air in the second portion of the Venturi conduit; and
    a controller configured to determine a leak and/or blockage within the aspirating detection system based on the detected differential pressure.

2. The detector unit as claimed in claim 1 wherein the controller is configured to determine a percentage variation in the detected differential pressure over a given period of time.

3. The detector unit as claimed in claim 2 wherein the controller is configured to compare the determined percentage variation in the detected differential pressure to a predetermined threshold value.

4. The detector unit as claimed in claim 3, wherein the predetermined threshold value is anywhere between 20% to 40%.

5. The detector unit as claimed in claim 3, wherein the controller is configured to generate an alert if the percentage variation in the detected differential pressure exceeds the predetermined threshold value.

6. The detector unit as claimed in claim 5, wherein the alert is an audible alert, a visual alert, and/or a wirelessly transmitted notification.

7. The detector unit as claimed in claim 1, wherein the Venturi conduit comprises part of a primary conduit that connects the aspirator to an outlet of the detector unit or a sampling conduit that connects the aspirator to the sensor chamber.

8. The detector unit as claimed in claim 1, wherein the Venturi conduit is located proximate to an outlet of the detector unit.

9. The detector unit as claimed in claim 1, wherein the detector unit is a smoke detector unit, and the aspirating detection system is an aspirating smoke detection system.

10. An aspirating detection system comprising:
    the detector unit of claim 1; and
    one or more sampling pipes for supplying air to the detector unit;

wherein the aspirator is configured to draw air into the detector unit via the sampling pipes.

11. A method for determining a leak and/or a blockage in an aspirating detection system using a detector unit, the method comprising:
- drawing air from an interior of a building through a Venturi conduit of a detector unit using an aspirator of a detector unit, the Venturi conduit comprising a first portion of the Venturi conduit and a second portion of the Venturi conduit, wherein a cross-sectional area of the first portion is smaller than a cross-sectional area of the second portion;
- detecting a differential pressure between the air in the first portion of the Venturi conduit and the air in the second portion of the Venturi conduit; and
- determining a leak and/or a blockage in the aspirating detection system based on the detected differential pressure.

12. The method as claimed in claim 11 comprising determining a percentage variation in the detected differential pressure over a given period of time.

13. The method as claimed in claim 12 comprising comparing the determined percentage variation in the detected differential pressure to a predetermined threshold value.

14. The method as claimed in claim 13 comprising generating an alert if the determined percentage variation in the detected differential pressure is above the predetermined threshold value.

15. The method as claimed in claim 11 comprising drawing air through a primary conduit and a sampling conduit of the detector unit, wherein the primary conduit or the sampling conduit comprises the Venturi conduit having the first and second portions.

* * * * *